United States Patent
Lindoff et al.

(10) Patent No.: US 8,731,562 B2
(45) Date of Patent: May 20, 2014

(54) DETECTION OF CONTROL MESSAGES FOR HSDPA

(75) Inventors: Bengt Lindoff, Bjärred (SE); Johan Nilsson, Höllviken (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 2168 days.

(21) Appl. No.: 11/286,974

(22) Filed: Nov. 23, 2005

(65) Prior Publication Data

US 2007/0049311 A1   Mar. 1, 2007

Related U.S. Application Data

(60) Provisional application No. 60/712,650, filed on Aug. 30, 2005.

(51) Int. Cl.
H04W 36/00 (2009.01)

(52) U.S. Cl.
USPC ........... 455/437; 455/438; 455/439; 455/440; 455/442; 455/443

(58) Field of Classification Search
USPC .................. 455/437, 438, 439, 440, 442, 443
See application file for complete search history.

(56) References Cited

U.S. PATENT DOCUMENTS

| | | | |
|---|---|---|---|
| 5,182,753 A | 1/1993 | Dahlin et al. | |
| 5,901,354 A | 5/1999 | Menich et al. | |
| 6,055,427 A | 4/2000 | Ojaniemi | |
| 7,065,351 B2 * | 6/2006 | Carter et al. | 455/423 |
| 7,376,424 B2 * | 5/2008 | Kim et al. | 455/436 |
| 7,406,070 B2 * | 7/2008 | Nilsson | 370/342 |
| 2003/0153272 A1 * | 8/2003 | Takano | 455/67.1 |
| 2004/0001428 A1 * | 1/2004 | Datta et al. | 370/208 |
| 2004/0156328 A1 * | 8/2004 | Walton et al. | 455/517 |
| 2004/0219959 A1 | 11/2004 | Khayrallah et al. | |
| 2005/0078648 A1 | 4/2005 | Nilsson | |
| 2005/0152308 A1 * | 7/2005 | Seol et al. | 370/328 |
| 2005/0180344 A1 * | 8/2005 | Sternberg et al. | 370/310 |
| 2005/0207374 A1 * | 9/2005 | Petrovic et al. | 370/331 |
| 2006/0039330 A1 * | 2/2006 | Hackett et al. | 370/335 |
| 2006/0209883 A1 * | 9/2006 | Suzuki | 370/465 |
| 2006/0239457 A1 * | 10/2006 | Ridler et al. | 380/212 |
| 2006/0246937 A1 * | 11/2006 | Lindoff | 455/522 |
| 2006/0281414 A1 * | 12/2006 | Lindoff et al. | 455/67.11 |
| 2008/0132232 A1 * | 6/2008 | Tomizu | 455/436 |

FOREIGN PATENT DOCUMENTS

| | | |
|---|---|---|
| EP | 1 223 769 | 7/2002 |
| EP | 04029822.6 | 6/2006 |
| WO | WO 03/069826 | 8/2003 |

* cited by examiner

*Primary Examiner* — Wen Huang
(74) *Attorney, Agent, or Firm* — Coats & Bennett, P.L.L.C.

(57) ABSTRACT

A adaptive method implemented by a mobile station improves the likelihood of detecting control messages transmitted to the mobile station in band on a shared downlink traffic channel. When the mobile station expects a control message to be transmitted on the shared downlink traffic channel, the mobile station may adapt the receiver configuration and/or receiver parameters to reduce a likelihood of missed detection of control messages. In one embodiment, the mobile station is configured to adjust a correlation threshold used for said scheduled transmission detection to reduce the likelihood of a missed detection.

46 Claims, 4 Drawing Sheets

DETECTION OF CONTROL MESSAGES FOR HSDPA

This application claims priority from U.S. Provisional Patent Application 60/712,650 filed 30 Aug. 2005, which is incorporated herein by reference.

BACKGROUND

The present invention relates generally to Code Division Multiple Access (CDMA) systems, and more particularly, to radio resource control signaling in CDMA systems.

High Speed Downlink Packet Access (HSDPA) is packet data service offered in Wideband Code Division Multiple Access (WCDMA) networks. The HSDPA is an evolution of WCDMA specified by the Third Generation Partnership Project (3GPP) in Release 99 of the WCDMA standard. The HSDPA, introduced in Release 5 of the WCDMA standard, provides peak data rates up to 10 Mbits/s using enhanced features such as higher-order modulation (16 QAM), physical layer hybrid automatic repeat request (H-ARQ), multicode transmission, fast link adaptation, and fast scheduling. The transport channel for HSDPA is the High Speed Downlink Shared Channel (HS-DSCH). The HS-DSCH is carried over the High Speed Physical Downlink Shared Channel (HS-PDSCH).

The HS-DSCH is a time multiplexed channel shared by a plurality of mobile stations. Mobile stations are scheduled to receive data transmitted on the HS-PDSCH by a serving base station. The scheduling interval is referred to as a Transmission Time Interval (TTI). During a given TTI, one or more mobile stations may be scheduled. The mobile stations report channel conditions to the base station on an uplink channel called the High Speed Dedicated Physical Control Channel (HS-DPCCH) to enable the base station to make scheduling decisions. The base station schedules the mobile station based, at least in part, on the reported channel conditions. The identity of the mobile stations scheduled to receive packet data on the HS-DSCH in a given TTI is transmitted on the High Speed Shared Control Channel (HS-SCCH). The HS-SCCH is also used to send transmission parameters needed by the mobile station to decode the HS-DSCH, such as the code channels, the transport block size, and the modulation scheme used in the corresponding TTI.

Unlike Dedicated Physical Channels (DPCH) in WCDMA, soft handoff is not supported for HSDPA. Due to the complexity of coordinating packet data transmissions between cells, hard handover (HHO) is used. The mobile station measures the instantaneous signal-to-intererence ratio of a pilot signal received from each cell in its active set and requests service from the cell providing the strongest signal. As the mobile station moves into a boundary zone between cells, the signal strength from the serving cell will diminish while the signal strength from a neighboring cell in its active set will increase. When the signal strength from the neighboring cell exceeds the signal strength from the current serving cell, the mobile station requests a handover from the current serving cell to a specified target cell. When the current serving base station acknowledges the handover request, the mobile station switches to the target cell and sends a handover complete message to the target base station to complete the handover. The target base station assumes the role as the serving base station and begins transmitting packet data to the mobile station.

The HS-DSCH, according to release 5 of the WCDMA standard, always operates in conjunction with an Associated Dedicated Physical Channel (A-DPCH) in both the uplink and downlink. The A-DPCH carries Radio Resource Control (RRC) messages between the mobile station and the base station. Radio resource control is a protocol that provides control of the mobile station by a radio network controller in a radio access network. The RRC functions include handover control of the mobile station in connected mode. Release 6 of the WCDMA standard allows a serving base station to send RRC signaling messages, including handover messages, to the mobile station in band over the HS-PDSCH instead of the A-DPCH.

The handover procedure typically takes about 200-800 ms to complete from the time that the mobile station sends the handover request. During that period, the signal quality on the HS-PDSCH from the serving cell may vary significantly. If the HS-PDSCH is used for sending handover messages to the mobile station instead of the A-DSCH, there is a greater risk of packet loss. If the channel conditions deteriorate too much, the mobile station may not be able to receive handover message from the serving base station, which may prevent the mobile station from completing the handover and may result in radio link failure, i.e. a dropped call.

Therefore, there is a need to make signaling between the base station and the mobile station more robust, particularly when in band signaling on the HS-DSCH is used to transmit handover messages to the mobile station.

SUMMARY

Embodiments of the present invention provide a method and apparatus for improving detection of radio resource control (RRC) messages transmitted to a mobile station in band over a shared downlink traffic channel. The method comprises adapting a receiver in a mobile station to reduce the likelihood of missed detection when an RRC message is expected to be sent to the mobile station over the shared downlink traffic channel. The receiver may be adapted by changing a receiver configuration and/or reception parameters used to receive signals. Changes in receiver configuration include changing a receiver mode (e.g., from RAKE reception mode to generalized RAKE (GRAKE) reception mode), or changing allocation of receiver resources (e.g., the number of RAKE/GRAKE fingers) to reduce likelihood of missed detection of RRC messages on the shared downlink traffic channel. Reception parameters, such as a correlation threshold used to detect scheduled transmissions to the mobile station over the shared downlink traffic channel, may also be adjusted when the mobile station expects RRC messages to be sent over the shared downlink traffic channel.

In one example embodiment, the mobile station is notified of scheduled transmissions on the shared downlink traffic channel by sending a control signal masked with a mobile specific sequence to the mobile station in advance of the scheduled transmission on the shared downlink traffic channel. The mobile station is configured to monitor the downlink control channel and to correlate the control signal received over the control channel with its own mobile specific sequence to detect the scheduled transmission on the shared downlink traffic channel. A correlation value is generated from the control signal and compared to a correlation threshold. When the correlation value meets the threshold, the mobile station decodes the shared downlink traffic channel in a corresponding time interval to receive the scheduled transmission. When the mobile station is expecting an RRC message from a radio network controller, the correlation threshold may be lowered to reduce the likelihood of a missed detection (i.e., the failure of the mobile station to detect the scheduled transmission).

As an example, the mobile station may send an RRC message to the radio network controller responsive to a handover event. In such case, the mobile station expects an acknowledgement of its handover messages. Thus, the mobile station may reduce the correlation threshold used to detect scheduled transmissions on the downlink shared channel to reduce the likelihood of missed detection.

DETAILED DESCRIPTION

Figure 1:
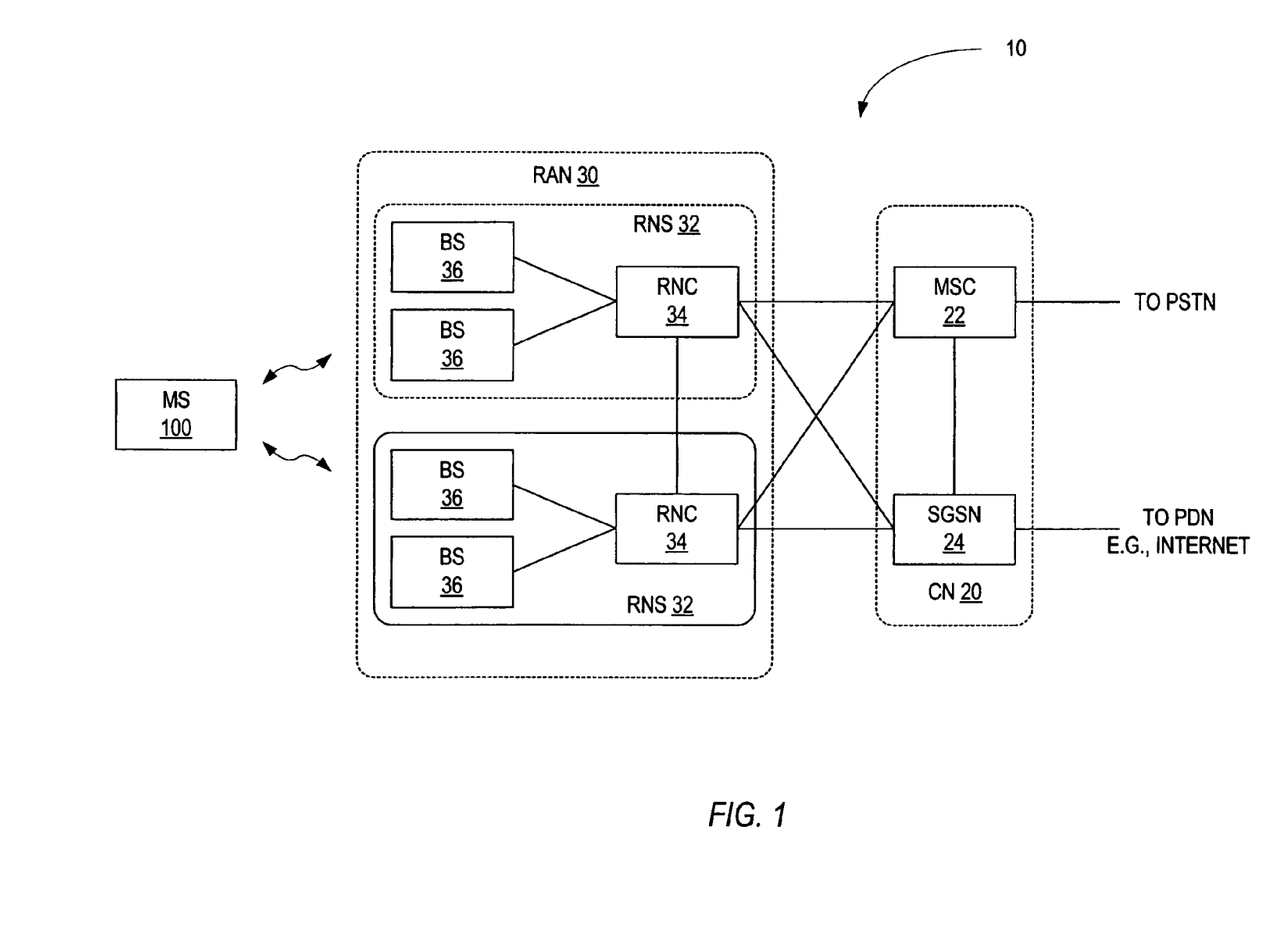
FIG. 1 illustrates an example mobile communication network.

FIG. 1 illustrates an example wireless communication network 10 for providing mobile communication services to one or more mobile stations 100. The term mobile station as used herein refers to any portable communication device having the ability to connect wirelessly to a communication network. The term mobile station includes, without limitation, mobile telephones, pagers, personal digital assistants, and laptop or handheld computers. The example wireless communication network 10 comprises a Wideband Code Division Multiple Access (WCDMA) system as specified by the Third Generation Partnership Project (3GPP). Those skilled in the art will recognize that the present invention may also be used in mobile communication networks based on other standards, such as cdma2000 (TIA-2000), 1xEV-DO (TIA-856a), and WiMAX (IEEE 802.16).

Wireless communication network 10 comprises a core network (CN) 20 connected to one or more external packet data networks, such as the Internet, and one or more radio access networks (RANs) 30. Core network 20 is responsible for the switching and routing of calls between the mobile stations 100 and the external networks. The core network 20 may include a Mobile Switching Center (MSC) 22 for providing circuit-switched services and a Serving GPRS Support Node (SGSN) 24 for providing packet switched services. The main function of the RAN 30 is to provide mobile stations (MSs) 100 with access to the core network 20. The RAN 30 includes one or more radio network sub-systems (RNSs) 32. An RNS 32 comprises a radio network controller (RNC) 34 and one or more base stations (BSs) 36, referred to in the WCDMA standards as Node Bs. This application uses the generic term base station (BS) instead of the WCDMA-specific term Node B.

BSs 36 communicate with the mobile stations 100 over the air interface and are normally associated with a cell. A BS 36 may provide service in more than one cell. The RNC 34 is the network component that connects the RAN 30 to the core network 20 and controls RAN functions. The RNC 34 manages the BSs 36 and radio resources within its domain and terminates Radio Resource Control (RRC). RRC is a protocol that provides control over the mobile station 100 by the RNC 34. The RRC functions performed by the RNC 34 include measurement reporting, active set management and handover control.

High Speed Downlink Packet Access (HSDPA) is one method implemented by the wireless communication network 10 to deliver packets on the downlink to the mobile station 100. HSDPA is an evolution of the WCDMA standard. HSDPA was introduced in Release 5 of the WCDMA standard. The main purpose of HSDPA is to increase data throughput using enhancements such as fast scheduling, fast link adaptation, physical layer automatic repeat request (HARQ), smaller packet size, and multi-code transmission. HSDPA takes advantage of the bursty nature of packet data to share the available radio resources among a plurality of users and thereby make more efficient use of those resources.

HSDPA provides a new transport channel for high speed packet delivery on the downlink called the High Speed Downlink Shared Channel (HS-DSCH) and three new physical channels: the High Speed Physical Downlink Shared Channel (HS-PDSCH) to carry user data, the High Speed Shared Control Channel (HS-SCCH) to carry control signals for identifying the mobile station 100 being scheduled and for indicating the transmission parameters needed by the mobile station 100 to decode the HS-PDSCH, and the High Speed Dedicated Physical Control Channel (HS-DPCCH) to carry uplink control signals, such as ACK/NACK signals for H-ARQ operation and Channel Quality Indications (CQI) for scheduling and rate control. The HSDPA, according to release 5 of the WCDMA standard, always operates in conjunction with a corresponding Associated Dedicated Physical Channel (A-DPCH) in both the uplink and downlink. The A-DPCH is used to send power control commands and may also be used to send RRC signaling between the mobile station 100 and the RNC 34.

Transmissions on the HS-DSCH are divided into 2 ms units of time called a Transmission Time Interval (TTI). A TTI is further divided into 3 timeslots of 0.667 ms each. A TTI is the basic unit of time used to schedule mobile stations 100 on the HS-DSCH. Scheduling is a function performed by a scheduler located in the serving BS 36. The scheduler at the serving BS 36 determines which mobile stations 100 shall receive data in each TTI based on factors such as the channel conditions reported by each mobile station 100, the amount of data pending in the buffer for each mobile station 100, the average throughput to each mobile station 100, and any Quality of Service (QoS) guarantees. The scheduling algorithm is typically determined by the network operator. During any given TTI, the BS 36 allocates up to 15 channelization codes to one or more mobile stations 100.

Figure 3:
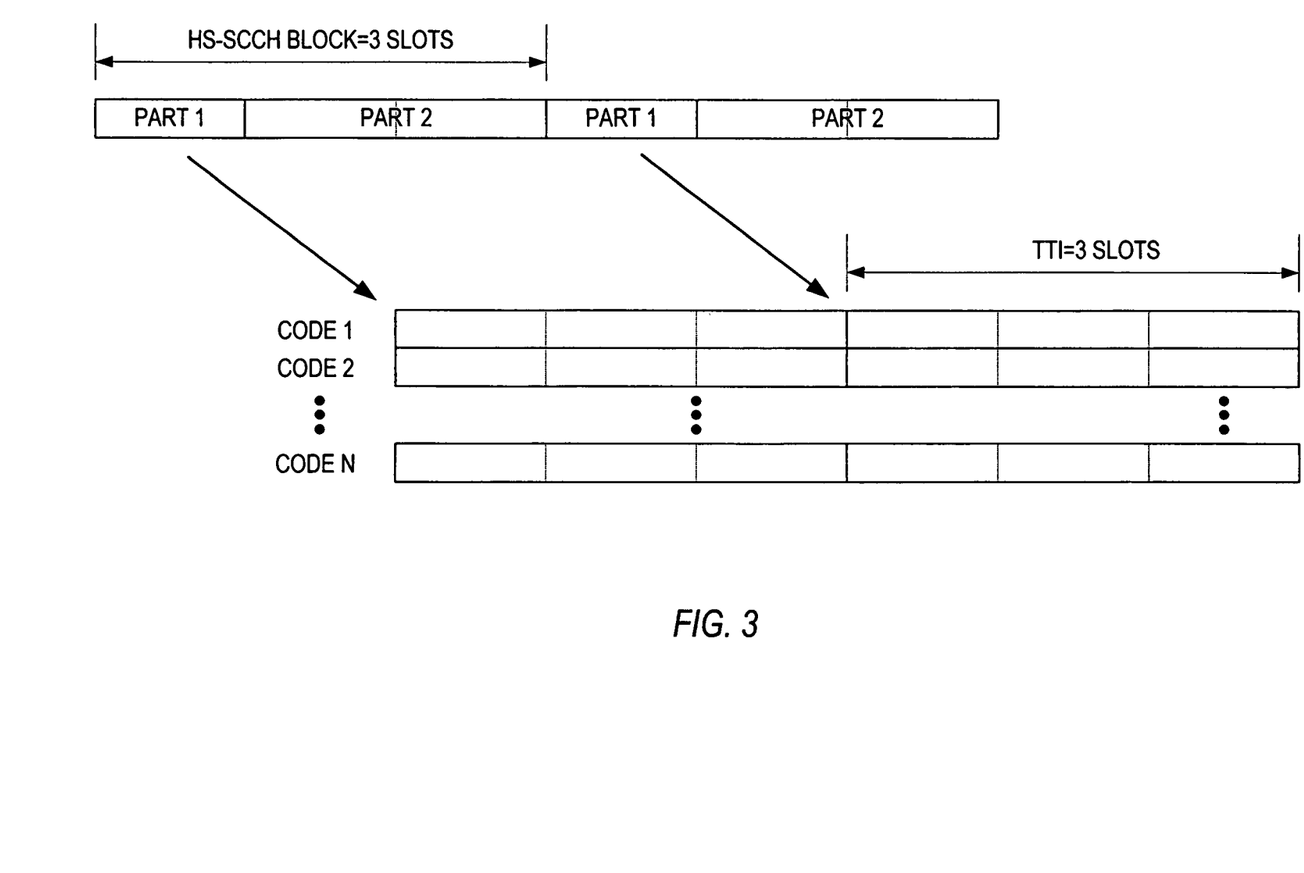
FIG. 3 illustrates a method for detecting scheduled transmissions on a shared downlink traffic channel.

BS 36 identifies the mobile station(s) 100 being scheduled, the code allocations, and the transmission format by sending control signals on the HS-SCCH as shown in FIG. 3. As used herein, the term control signals means signals transmitted by the BS 36 to the mobile station 100 carrying control information, as distinguished from traffic signals that carry user data. The HS-SCCH is a fixed rate channel (60 kbps, spreading factor=128) used to transmit the mobile station identity and the transmission parameters for the HS-PDSCH in advance of the start of a corresponding TTI. The HS-SCCH block is three slots in length and is divided into two parts. Part 1 comprises one slot and carries critical information needed by the mobile station 100 to begin demodulation of the HS-PDSCH, such as the code allocations for the HS-PDSSCH, the transmission block size, and the modulation scheme. Part 2 comprises two slots and carries less critical information, such as a Cyclic Redundancy Check (CRC) and HARQ process information. BS 36 transmits the HS-SCCH two timeslots before the start of the corresponding TTI. Both parts are transmitted with a mobile specific sequence that identifies the mobile station 100 scheduled in the corresponding TTI. For example, a masking sequence unique to the mobile station can be applied to the control signal. However, the term mobile-specific signal should be broadly understood to refer to any sequence that uniquely identifies the mobile station. As described below, the mobile station 100 being scheduled can correlate its mobile-specific sequence with the received control signal to determine whether it is being scheduled.

The mobile station 100 monitors the HS-SCCH to determine when it is scheduled to receive packet data on the HS-PDSCH. The mobile station 100 correlates Part 1 of the HS-SCCH with a mobile specific masking sequence to generate a correlation value and compares the correlation value to a correlation threshold. This process is referred to herein as HS-SCCH detection or scheduled transmission detection. Simultaneously, the mobile station 100 decodes Part 1 of the HS-SCCH to obtain transmission parameters needed to decode the HS-PDSCH. After decoding Part 1, the mobile station 100 configures its receiver to receive data on the HS-PDSCH and begins decoding Part 2 of the HS-SCCH, which contains the CRC and HARQ process information. After decoding the HS-PDSCH, the mobile station 100 sends an ACK/NACK indicator to the BS 36 on the HS-DPCCH to indicate whether the packet data was successfully received. Correlation techniques for correlating Part 1 of the HS-SCCH with a mobile-specific sequence are described in co-pending U.S. patent application Ser. No. 10/780,633 filed Feb. 19, 2004, which is incorporated herein by reference.

The correlation threshold used by the mobile station 100 to detect scheduled transmission on the shared downlink traffic channel, i.e., HS-SCCH detection, represents a tradeoff between the probability of a false detection and the probability of a missed detection. False detection occurs when the mobile station 100 incorrectly determines that it is the scheduled user. A missed detection occurs when the mobile station 100 fails to detect a scheduled transmission to the mobile station 100 on the shared downlink traffic channel. False detection leads to increased power consumption in the mobile station 100 attributable to the mobile station unnecessarily decoding Part 2 of the HS-SCCH and the HS-PDSCH. The attempt by the mobile station 100 to decode Part 2 of the HS-SCCH and the HS-PDSCH will fail. Missed detection, on the other hand, leads to decreased throughput since data has to be retransmitted to the mobile station 100 when the mobile station 100 fails to acknowledge the transmitted packet.

Due to the complexity of coordinating downlink transmissions on the HS-DSCH in different cells, soft handoff is not employed on the HS-DSCH when the mobile station 100 moves between cells. Instead, a hard handover is used. Handover control is part of the RRC function performed by the RNC 34. The mobile station 100 measures the instantaneous Signal-to-Interference Ratio (SIR) of the pilot signal received from each cell in its active set and requests service from the cell providing the strongest signal. As the mobile station 100 moves into a boundary zone between cells, the signal strength from the serving cell will diminish while the signal strength from a neighboring cell in its active set will increase. When the signal strength from the neighboring cell exceeds the signal strength from the current serving cell, the mobile station 100 sends a handover request to the RNC 34 through the current serving cell. The handover request identifies a target cell for the handover. The RNC 34 begins a reconfiguration process to reroute the packet data to the target cell and, in conventional systems, sends a reconfiguration message back to the mobile station 100 through the current serving BS 36. Upon receipt of the reconfiguration message, the mobile station 100 switches to the target cell and sends a handover complete message to the RNC 34 in the target cell to complete the handover. The BS 36 for the target cell assumes the role as the serving BS 36 and begins transmitting packet data to the mobile station 100 on the HS-PDSCH.

In Release 6 of the WCDMA standard, RRC messages, such as handover messages, from the RNC 34 to the mobile station 100 may be transmitted in-band over the HS-PDSCH or over the A-DPCH. The possibility of using in-band RRC signaling on the HS-PDSCH was introduced to reduce the radio resources dedicated for signaling. By using in-band signaling, the amount of BS power allocated to the A-DPCH is reduced thereby increasing the power available for the HS-DSCH. If in band signaling is used, the DPCH only carries power control information and is called a fractional DPCH (F-DPCH).

When in-band signaling on the HS-DSCH is used for RRC signaling, missed detection of critical RRC messages becomes a concern. When the mobile station 100 is operating in a boundary region between two cells, the signal quality from the current serving BS 36 may fluctuate significantly. The handover procedure typically takes about 200-800 ms to complete from the time that the mobile station 100 indicates the need for a handover. Deterioration in the signal quality from the serving cell will increase the likelihood of missed detection. The failure of the mobile station 100 to detect critical RRC messages intended for the mobile station 100, such as handover messages, due to deteriorating signal quality may result in lower throughput and, in a worst case scenario, radio link failure.

According to one embodiment of the invention, the correlation threshold used by mobile station 100 to detect scheduled transmissions on the shared downlink traffic channel is adapted when the mobile station 100 is expecting an important RRC message to reduce the likelihood of missed detection. For example, when the mobile station 100 sends a handover request (known as Event 1D in WCDMA) to the RNC 34, an acknowledgement of the handover request (known as a reconfiguration message in WCDMA) will be expected within a predetermined time (e.g., 100-400 ms). During the period of time that the mobile station 100 is expecting an acknowledgement of the handover request, the mobile station 100 may lower the correlation threshold used of HS-SCCH detection, thereby reducing the probability of a missed detection. Use of this technique is not limited to cell reselection but may be used for other handover events. As used herein, the term handover event means any event resulting in a change in the radio link between the mobile station 100 and the RAN 30. Handover messages comprise messages triggered by a handover event. Handover messages include messages used to modify the active set of the mobile station 100 in addition to messages used for cell reselection. For example, when the mobile station 100 requests modification of the active set (e.g., the addition of a cell to the active set (Event 1A), the removal of a cell from the active set (Event 1B), or the replacement of an existing cell in the active set with a new cell (Event 1C), the correlation threshold may be adapted to improve HS-SCCH detection. In addition to handover messages, other messages or trigerring events that cause downlink RRC messages to be sent to the mobile station 100 by the RNC 34 may be used as a trigger for adjustment of the correlation threshold.

Adjustment of the correlation threshold may also be dependent on the signal strength from the serving cell. The mobile station 100 may evaluate the signal strength in determining whether to adapt the correlation threshold, or to determine the amount of the adjustment to make. For example, a small or no adjustment may be made when the mobile station 100 receives a strong signal from the serving cell. A larger adjustment may be made when the mobile station 100 receives a weak signal from the serving cell.

When the correlation threshold is reduced by the mobile station 100 responsive to a triggering event, the mobile station 100 may also determine the length of the window during which the reduced correlation threshold is applied, referred to herein as the reduced threshold detection window. The length of the reduced threshold detection window may be dependent on the type of event, and may be determined based on statistical data, such as the average latency between the triggering event and the responsive RRC signaling from the RNC 34. Alternatively, the length of the reduced correlation threshold window can be pre-computed and stored in look-up tables. In any case, mobile station 100 adjusts the threshold responsive to a triggering event and adjusts the threshold back to the normal values when the reduced threshold detection window ends.

Figure 2:
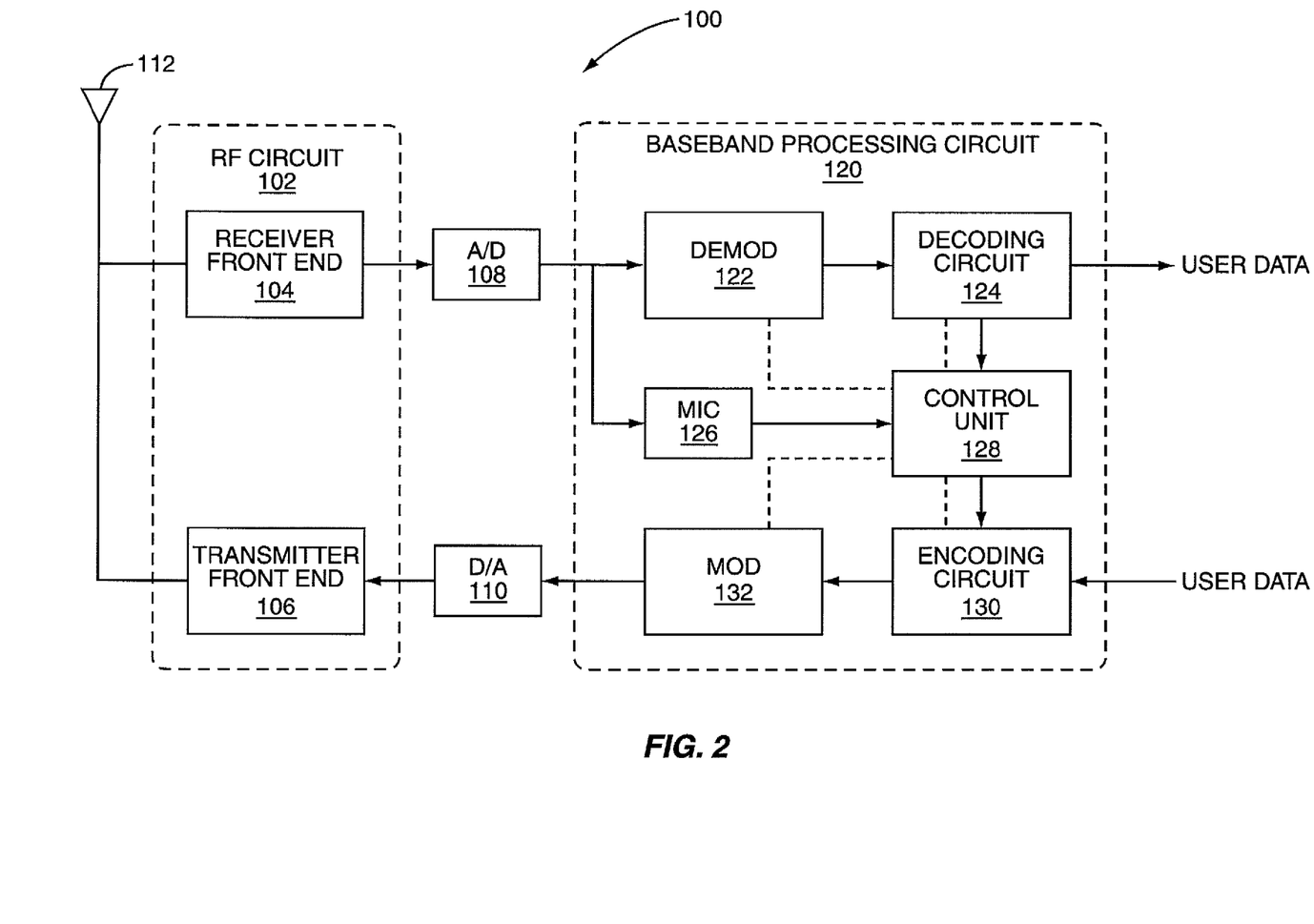
FIG. 2 illustrates an example mobile station.

FIG. 2 illustrates an example mobile station 100 according to the present invention. Mobile station 100 comprises an RF circuit 102 coupled to one or more antennas 112 and baseband processing circuits 120. The RF circuit 102 comprises a receiver front end 104 and transmitter front end 106. Receiver front end 104 filters, amplifies, and downconverts the received signal. Analog-to-digital converter 108 converts the received signal output from the receiver front end 104 to a digital signal suitable for processing by the baseband processing circuit 120. On the transmit side, digital-to-analog converter 110 converts transmit signals output from the baseband processing circuit 120 to analog signals suitable for transmission. Transmitter front end 106 modulates the analog transmit signal onto an RF carrier for transmission.

Baseband processing circuit 120 comprises a demodulator 122, decoding circuit 124, measurement circuit (MC) 126, control unit 128, encoding circuit 130, and modulator 122. The elements of the baseband processing circuit 120 may be implemented in a processing circuit comprising one or more processors. Demodulator 122 demodulates signals received over the air interface from the mobile station 100 and supplies the demodulated signals to the decoding circuit 124. Demodulator 122 may, for example, comprise a RAKE receiver, generalized RAKE (GRAKE) receiver, or chip equalization receiver. The demodulator 132 may be configurable by the control unit 128. For example, the control unit 128 may selectively configure the receiver as either a RAKE receiver or GRAKE receiver (or chip equalizer receiver). Control processor 128 may also select the number of antennas used for detection, and the allocation of RAKE and/or GRAKE fingers (or chip equalizer taps) or other receiver resources.

Decoding circuit 124 performs channel decoding and separates user data from control signaling. The control signaling is passed to control unit 128, which controls the overall operation of the mobile station 100. The control unit 128, which may comprises one or more processors, handles layer 2 and layer 3 signaling and outputs control signals to control operation of the mobile station 100. The control signals, shown in dotted lines, control the demodulator 122, decoding circuit 124, encoding circuit 130, and modulator 132. Measurement circuit 126 performs measurements on the received signal, such as signal strength measurements, signal quality measurements, etc., and provides the measurements to the control unit 128. Encoding circuit 130 performs channel coding of user data and control signaling. Modulator 132 digitally modulates the signals output from the encoding circuit 130 to generate a transmit signal that is applied to the digital-to-analog converter 110.

The receiver front end 104, A/D converter 108, demodulator 122 and decoding circuit 124 comprise a receiver. The transmitter front end 106, D/A converter 110, modulator 132, and encoding circuit 130 comprise a transmitter. The elements or components of the mobile station 100, such as the baseband processing circuit 120, may be implemented using a variety of hardware and software. For example, the baseband processing circuit 120 may be implemented using microprocessors, microcomputers, digital signal processors, special-purpose hardware such as an application specific integrated circuit (ASIC), or a combination thereof. Further, it will be appreciated that the functions of the baseband processing circuit 120 may be integrated in a single device, such as a single ASIC or microprocessor, or may also be distributed among several devices.

Figure 4:
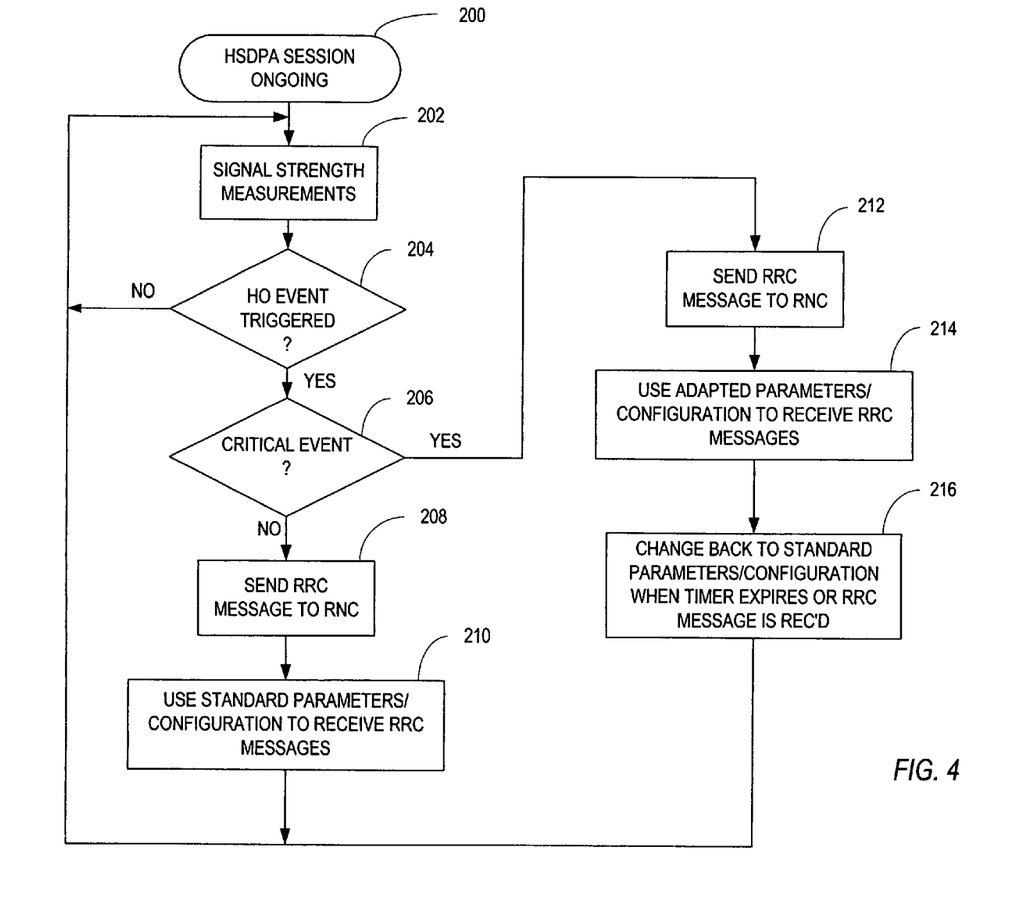
FIG. 4 illustrates and example procedure implemented by a mobile station to detect scheduled transmissions on a shared downlink traffic channel.

FIG. 4 is a flow diagram illustrating an example procedure implemented by a mobile station 100. The procedure is executed when the mobile station 100 has an on-going HSDPA session (block 200). During the HSDPA session, the mobile station 100 periodically makes signal strength measurements (block 202). The signal strength measurements are used by the mobile station 100 to determine when to make changes to the active set and when to change the serving cell. These events are referred to herein as handover events. The handover events include the addition of a cell to the active set (event 1A), the removal of a cell from the active set (event 1B), the replacement of an existing cell in the active set with a new cell (event 1C), and the change of a serving cell (event 1D). The mobile station 100 detects handover events based on signal strength measurements as is well-known in the art. Upon detection of a handover (HO) event (block 204), mobile station 100 determines whether or not the detected handover event is a critical event (block 206). If the handover event is not a critical event, the mobile station 100 sends a notification message (e.g., events 1A, 1B, 1C and 1D) to the RNC 34 to notify the RNC 34 of the event (block 208) and waits for a reply message. In this case, the mobile station 100 uses a normal correlation threshold for HS-SCCH detection (block 210). On the other hand, if the handover event is a critical event, the mobile station 100 sends an RRC message on the uplink to the RNC 34 (block 212) and uses an adjusted correlation threshold for HS-SCCH detection (block 214). After receiving the expected response, or after the reduced threshold detection window expires, the mobile station 100 changes back to the default HS-SCCH detection parameters (block 216). Examples of critical events include Events 1A and 1C when the signal strength from the serving cell is weak, and Event 1D. Events 1A and 1C may not be considered critical events if a strong pilot signal is received from the serving cell. In some embodiments, Event 1B may be considered not a critical event.

In the example embodiment of the invention described above, the mobile station 100 adapts a correlation threshold for HS-SCCH detection in order to reduce likelihood of misdetection. Those skilled in the art will recognize that other techniques can be used in place of, or in addition to, those described above to improve the likelihood of detecting critical RRC messages. For example, the control processor 128 may adapt the receiver configuration to improve likelihood of detecting critical RRC messages. If a RAKE receiver or GRAKE receiver is used to receive signals on the downlink, the mobile station 100 can allocate additional RAKE or GRAKE fingers to the HS-SCCH when critical RRC messages are expected. Employing additional RAKE fingers would improve the likelihood of receiving and correctly decoding the HS-SCCH and thereby reduce the likelihood of missed detection. Alternatively, the mobile station 100 could use a more advanced receiver configuration, e.g. a GRAKE configuration, for detecting HS-SCCH when critical RRC messages are expected and otherwise use a standard RAKE receiver for detecting the HS-SCCH. The receiver may also be adapted by changing the number of receive antennas 112. The above-described adaptations for the HS-SCCH may also be carried out for the HS-PDSCH. In broad terms, any adaptation of the receiver that reduces likelihood of missed detection of the HS-SCCH or HS-PDSCH can be employed. Such adaptations may include adaptations of the receiver configuration and/or adaptations of reception parameters, such as the correlation threshold for the HS-SCCH or the HS-PDSCH.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method implemented by a mobile station of detecting control messages transmitted in band on a shared downlink traffic channel, said method comprising:
    detecting scheduled transmissions on a shared downlink traffic channel intended for the mobile station by correlating a mobile specific sequence with a control signal transmitted over a control channel in advance of the scheduled transmission on the shared downlink traffic channel; and
    decreasing a correlation threshold used for said scheduled transmission detection to reduce the likelihood of a missed detection responsive to a handover event;
    wherein decreasing the correlation threshold responsive to a handover event comprises decreasing the correlation threshold for a predetermined time period.

2. The method of claim 1 wherein detecting scheduled transmissions on the shared downlink traffic channel comprises comparing a correlation value generated from said control signal with said correlation threshold.

3. The method of claim 1 further comprising sending a request message in response to said handover event, wherein the decreasing of the correlation threshold is made to improve detection of a reply to said request message.

4. The method of claim 3 wherein said request message comprises a request to change a serving cell.

5. The method of claim 3 wherein said request message comprises a request to change membership in an active set for said mobile station.

6. The method of claim 1 wherein adjusting the correlation threshold responsive to a handover event comprises:
    determining whether the handover event is a critical event; and
    adjusting the correlation threshold if the handover event is a critical event.

7. The method of claim 6 further comprising leaving the correlation threshold unchanged if the handover event is not a critical event.

8. The method of claim 1 wherein the duration of the predetermined time period depends on the type of the handover event.

9. The method of claim 1 further comprising adjusting the correlation threshold to a previous value when the predetermined time period expires.

10. The method of claim 1 wherein decreasing the correlation threshold comprises determining an amount of change in the correlation threshold.

11. The method of claim 10 wherein the amount of change in the correlation threshold is determined based on a strength of a signal received at the mobile station from a serving cell.

12. The method of claim 10 wherein the amount of change in the correlation threshold is determined based on the type of the handover event.

13. The method of claim 1 wherein the control channel comprises a High Speed Shared Control Channel in a WCDMA system, and wherein said shared traffic channel comprises a High Speed Physical Downlink Shared Channel in a WCDMA system.

14. A mobile station comprising:
    a receiver configured to receive packets over a shared downlink traffic channel; and
    a control unit configured to detect scheduled transmissions of the packets to the mobile station over the shared downlink traffic channel and to adapt said receiver to reduce a likelihood of a missed detection responsive to a handover event;
    wherein the control unit adapts the receiver by changing reception parameters used by said receiver responsive to the handover event;
    wherein the control unit is configured to adapt scheduled transmissions on said shared downlink traffic channel by correlating a control signal transmitted on a control channel in advance of the scheduled transmission on the shared downlink traffic channel with a mobile specific sequence;
    wherein the control channel comprises a High Speed Shared Control Channel in a WCDMA system, and wherein said shared traffic channel comprises a High Speed Physical Downlink Shared Channel in a WCDMA system;
    wherein the control unit is configured to correlate said control signal with a mobile specific sequence by generating a correlation value and comparing the correlation value with a correlation threshold;
    wherein the control unit is configured to adapt the receiver by adapting the correlation threshold responsive to the handover event; and
    wherein the control unit is configured to adapt the correlation threshold responsive to the handover event by changing the correlation threshold for a predetermined time period.

15. The mobile station of claim 14 wherein the control unit is configured to adapt the receiver by changing a configuration of the receiver responsive to the handover event.

16. The mobile station of claim 15 wherein the control unit is configured to change the receiver configuration by changing a receiving mode of said receiver.

17. The mobile station of claim 16 wherein the control unit is configured to change the receiving mode from a RAKE receiving mode to a generalized RAKE receiving mode responsive to the handover event.

18. The mobile station of claim 16 wherein the control unit is configured to change the receiving mode by changing the number of receive antennas used by the receiver.

19. The mobile station of claim 15 wherein the receiver comprises a RAKE receiver or a generalized RAKE receiver having a plurality of RAKE fingers and wherein the control unit is configured to change the receiving mode by changing the RAKE finger allocation for the control channel.

20. The mobile station of claim 14 wherein the control unit is configured to send a request message in response to said handover event, and wherein the control unit is configured to adapt said correlation threshold to improve detection of a reply to said request message.

21. The mobile station of claim 20 wherein the request message comprises a request to change a serving cell.

22. The mobile station of claim 20 wherein said request message comprises a request to change membership in an active set for said mobile station.

23. The mobile station of claim 14 wherein the control unit is configured to adapt the correlation threshold if the handover event is a critical event.

24. The mobile station of claim 23 wherein the control unit is configured to leave the correlation threshold unchanged if the handover event is not a critical event.

25. The mobile station of claim 14 wherein the time period depends on the type of the handover event.

26. The mobile station of claim 14 wherein the control unit is configured to adjust the correlation threshold to a previous value when the predetermined time period expires.

27. The mobile station of claim 14 wherein the control unit is configured to adapt the correlation threshold by determining an amount of change in the correlation threshold.

28. The mobile station of claim 27 wherein the control unit is configured to determine the amount of change in the correlation threshold based on a strength of a signal received at the mobile station from a base station in a serving cell.

29. The mobile station of claim 27 wherein the control unit is configured to determine the amount of change in the correlation threshold based on the type of the handover event.

30. A method implemented by a mobile station of detecting control messages transmitted in band on a shared downlink traffic channel, said method comprising:
    adapting a receiver in the mobile station to reduce the likelihood of a missed detection of packets on the shared downlink channel responsive to a handover event; and
    monitoring a control channel to detect whether the mobile station is scheduled to receive data on said shared downlink channel;
    wherein adapting the receiver comprises changing reception parameters used by said receiver responsive to the handover event;
    wherein monitoring the control channel to detect whether the mobile station is scheduled to receive data on said shared downlink channel comprises:
        correlating a control signal with a mobile specific sequence to generate a correlation value; and
        comparing the correlation value to a correlation threshold;
    wherein adapting the receiver comprises adapting the correlation threshold responsive to the handover event; and
    wherein adapting the correlation threshold responsive to the handover event comprises changing the correlation threshold for a predetermined period of time.

31. The method of claim 30 wherein adapting the receiver comprises changing a receiver configuration responsive to the handover event.

32. The method of claim 31 wherein changing the receiver configuration comprises changing a receiving mode of said receiver.

33. The method of claim 32 wherein changing the receiving mode of said receiver comprises changing from a RAKE receiving mode to a generalized RAKE receiving mode.

34. The method of claim 32 wherein changing the receiving mode of said receiver comprises changing the number of receive antennas used by the receiver.

35. The method of claim 31 wherein the receiver comprises a RAKE receiver or a generalized RAKE receiver having a plurality of RAKE fingers and wherein changing the receiver configuration comprises changing an allocation of said RAKE fingers.

36. The method of claim 30 wherein the control channel comprises a High Speed Shared Control Channel in a WCDMA system, and wherein said shared traffic channel comprises a High Speed Physical Downlink Shared Channel in a WCDMA system.

37. The method of claim 30 further comprising sending a request message in response to said handover event, wherein the adaptation of the correlation threshold is made to improve detection of a reply to said request message.

38. The method of claim 37 wherein said request message comprises a request to change a serving cell.

39. The method of claim 37 wherein said request message comprises a request to change membership in an active set for said mobile station.

40. The method of claim 30 wherein adapting the correlation threshold responsive to the handover event comprises:
    determining whether the handover event is a critical event; and
    adjusting the correlation threshold if the handover event is a critical event.

41. The method of claim 40 further comprising leaving the correlation threshold unchanged if the handover event is not a critical event.

42. The method of claim 30 wherein the duration of the predetermined time period depends on the type of the handover event.

43. The method of claim 30 further comprising adjusting the correlation threshold to a previous value when the predetermined time period expires.

44. The method of claim 30 wherein adapting the correlation threshold comprises determining an amount of change in the correlation threshold.

45. The method of claim 44 wherein the amount of change is determined based on a strength of a signal received at the mobile station from a base station in a serving cell.

46. The method of claim 44 wherein the amount of change is determined based on the type of the handover event.

* * * * *

UNITED STATES PATENT AND TRADEMARK OFFICE
CERTIFICATE OF CORRECTION

Page 1 of 1

PATENT NO. : 8,731,562 B2
APPLICATION NO. : 11/286974
DATED : May 20, 2014
INVENTOR(S) : Lindoff et al.

It is certified that error appears in the above-identified patent and that said Letters Patent is hereby corrected as shown below:

IN THE DRAWINGS:

In Fig. 2, Sheet 2 of 4, delete "CONTROL UNIT 128" and insert -- CONTROL PROCESSOR 128 --, therefor.

IN THE SPECIFICATION:

In Column 1, Line 49, delete "signal-to-intererence" and insert -- signal-to-interference --, therefor.

In Column 4, Lines 5-6, delete "automatic repeat request (HARQ)," and insert -- hybrid automatic repeat request (HARQ), --, therefor.

In Column 7, Line 32, delete "control unit 128," and insert -- control processor 128, --, therefor.

In Column 7, Line 41, delete "control unit 128." and insert -- control processor 128. --, therefor.

In Column 7, Lines 41-42, delete "control unit 128" and insert -- control processor 128 --, therefor.

In Column 7, Line 50, delete "control unit 128," and insert -- control processor 128, --, therefor.

In Column 7, Line 51, delete "control unit 128," and insert -- control processor 128, --, therefor.

In Column 7, Lines 59-60, delete "control unit 128." and insert -- control processor 128. --, therefor.

Signed and Sealed this
Eighteenth Day of November, 2014

Michelle K. Lee
*Deputy Director of the United States Patent and Trademark Office*